US009064042B2

(12) United States Patent
Meagher et al.

(10) Patent No.: US 9,064,042 B2
(45) Date of Patent: Jun. 23, 2015

(54) INSTRUMENTING COMPUTER PROGRAM CODE BY MERGING TEMPLATE AND TARGET CODE METHODS

(71) Applicant: Riverbed Technology, Inc., San Francisco, CA (US)

(72) Inventors: Robert Meagher, Greenfield, NH (US); Jeffrey LeCours, Merrimack, NH (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 0 days.

(21) Appl. No.: 14/060,271

(22) Filed: Oct. 22, 2013

(65) Prior Publication Data

US 2014/0137083 A1     May 15, 2014

Related U.S. Application Data

(60) Provisional application No. 61/726,067, filed on Nov. 14, 2012.

(51) Int. Cl.
*G06F 9/44*        (2006.01)
*G06F 11/34*     (2006.01)

(52) U.S. Cl.
CPC ...... *G06F 11/3466* (2013.01); *G06F 2201/865* (2013.01); *G06F 2201/87* (2013.01)

(58) Field of Classification Search
USPC .................................. 717/123–132, 140–142
IPC ......... G06F 11/366,11/3644, 11/3628, 11/3636, G06F 11/30
See application file for complete search history.

(56) References Cited

U.S. PATENT DOCUMENTS

| | | | | | |
|---|---|---|---|---|---|
| 5,093,914 | A | * | 3/1992 | Coplien et al. | 717/129 |
| 6,070,009 | A | * | 5/2000 | Dean et al. | 717/130 |
| 6,158,045 | A | * | 12/2000 | You | 717/124 |
| 6,760,903 | B1 | * | 7/2004 | Morshed et al. | 717/130 |
| 7,114,150 | B2 | * | 9/2006 | Dimpsey et al. | 717/131 |
| 7,146,606 | B2 | * | 12/2006 | Mitchell et al. | 717/141 |
| 7,191,433 | B2 | * | 3/2007 | Narad et al. | 717/140 |
| 7,389,497 | B1 | * | 6/2008 | Edmark et al. | 717/130 |
| 7,441,233 | B1 | * | 10/2008 | Orndorff et al. | 717/125 |
| 7,506,318 | B1 | * | 3/2009 | Lindo et al. | 717/130 |
| 7,516,446 | B2 | * | 4/2009 | Choi et al. | 717/128 |
| 7,779,394 | B2 | * | 8/2010 | Homing et al. | 717/136 |
| 7,818,729 | B1 | * | 10/2010 | Plum et al. | 717/140 |
| 7,823,135 | B2 | * | 10/2010 | Horning et al. | 717/127 |
| 7,926,043 | B2 | * | 4/2011 | Vaswani et al. | 717/130 |
| 8,079,019 | B2 | * | 12/2011 | Lindo et al. | 717/129 |
| 8,464,223 | B2 | * | 6/2013 | Choi et al. | 717/126 |

OTHER PUBLICATIONS

Krischer et al, "Usability Challenges in Exception Handling", IEEE, pp. 7-13, 2012.*
Agarwal, "Adaptive Incremental Checkpointing for Massively Parallel Systems", ACM, pp. 277-286, 2004.*

(Continued)

*Primary Examiner* — Anil Khatri
(74) *Attorney, Agent, or Firm* — Park, Vaughan, Fleming & Dowler LLP

(57) ABSTRACT

Embodiments provide systems, methods, and computer program products for instrumenting software application code. A target method and a template method may each be elevated to respective linked lists that maintain offsets in a relative relationship using pointers. The lists are merged and converted back to byte code as an instrumented method.

17 Claims, 17 Drawing Sheets

(56) References Cited

OTHER PUBLICATIONS

Tikir et al, "Efficient Instrumentation for Code Coverage Testing", ACM, pp. 86-96, 2002.*

Gupta et al, "Dynamic Code Instrumentation to Detect and Recover from Return Address Corruption" ACM, pp. 65-71, 2006.*

* cited by examiner

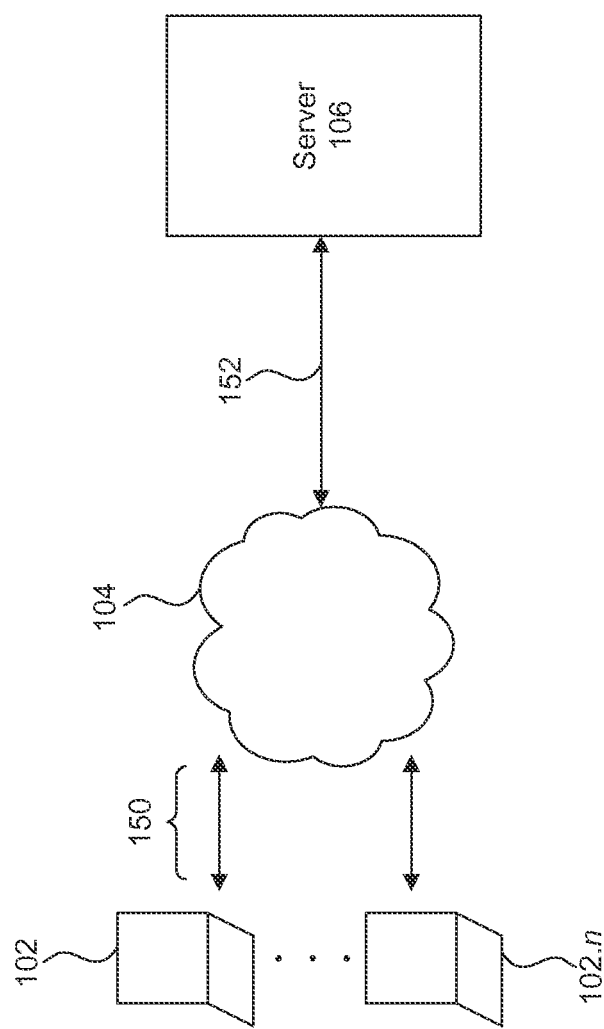

INSTRUMENTING COMPUTER PROGRAM CODE BY MERGING TEMPLATE AND TARGET CODE METHODS

CROSS-REFERENCE TO RELATED APPLICATIONS

The present application claims the benefit of U.S. Provisional Patent Application No. 61/726,067, filed on Nov. 14, 2012, which is incorporated herein by reference in its entirety.

BACKGROUND

1. Technical Field

The present disclosure relates generally to the instrumentation of software code for software application performance and transaction monitoring.

2. Background

Instrumentation of software application code is a process of inserting additional instructions into the code stream to enable measurement of one or more properties of the code while executing in an environment. These additional instructions do not change the intended behavior of the software application code. Instead, the additional instructions can either make calls to an agent that records the callout time and other data points, or record the information directly in-line with the original code. Instrumentation of software application code, referred to herein as target code, may occur by wrapper methods or by in-line instrumentation.

The wrapper methods, generally, replace the original code with a shell that performs recording and calls the original code. Wrapper methods generate an extra call level in the call tree hierarchy, have difficulties interacting with the runtime environment (e.g., .NET or Java Virtual Machine) due to complexity, and may create a security threat to the operating environment because of the changes the wrapper methods make to the call stack.

In-line instrumentation addresses several of these issues; in-line instrumentation inserts a prolog (which includes code to record a program state at the start of the target code) before the target code and an epilog (which includes code to record a program state at the completion of the target code) after the target code. Although in-line instrumentation is not subject to the same challenges as wrapper methods, in-line instrumentation is also beset with difficulties. Additional instructions must be inserted into key places in the target code, which requires analysis and alteration of both the inserted code and the target code in order to address any possible changes in branch target offsets and to guarantee execution of the inserted epilog code. The analysis and alteration may require multiple passes through the code, where branch target offsets may have to be recomputed several times.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

FIG. 1A illustrates an exemplary environment in which monitoring may occur according to an embodiment.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Figure 1B:
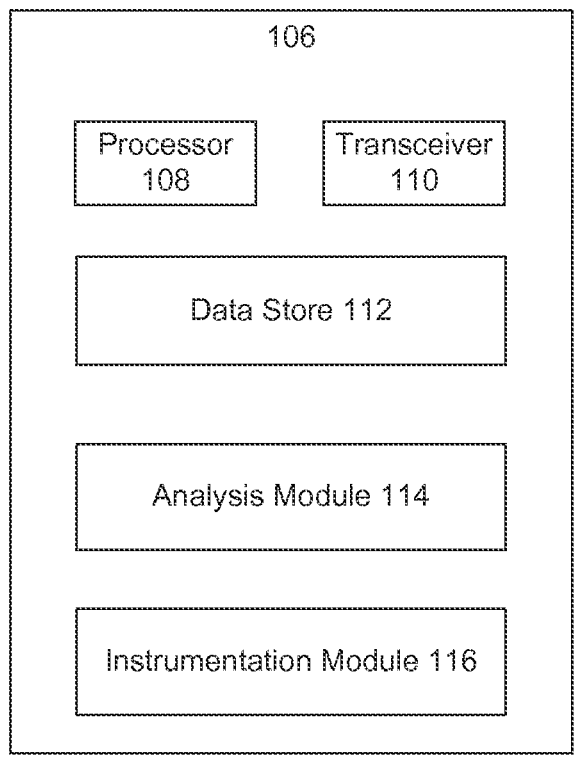
FIG. 1B illustrates an exemplary server apparatus according to an embodiment.

FIG. 1A illustrates an exemplary environment 100 in which software application code may execute, according to an embodiment of the present disclosure. Example environment 100 is provided for the purpose of illustration and is not limiting of embodiments of the present disclosure. As will be discussed in more detail with respect to the various embodiments and figures below, embodiments of the present disclosure enable the instrumentation of software application code in a more efficient manner that simplifies the amount of analysis and adjustment required for an instrumented version of the software application code to operate.

Embodiments of the present disclosure may be implemented within the .NET Framework, by Microsoft®, for example in the Common Language Runtime (CLR). In these embodiments, the software application code may be described with reference to modules. A module may be a compilation of byte code, for example in the .NET environment Common Intermediate Language (CIL) code, that is composed of one or more byte sequences. The compilation of byte code may have been organized into a hierarchy of classes, where types in each class enumerate the methods and members of that class. In an example, the byte code may be a series of opcodes and operands, as will be understood by those skilled in the relevant art(s). As an alternative example, embodiments of the present disclosure may be implemented with the Java™ environment, for example as part of a Java™ Virtual Machine (JVM). Java™ does not implement modules in the same manner as the .NET Framework, instead dealing directly with classes. These classes may be compiled into class files that, together, can be incorporated into a Java™ Archive (JAR) file. For the sake of simplicity, the present disclosure will discuss exemplary embodiments with respect to the .NET Framework, although other frameworks can also be used as will be recognized by those skilled in the relevant art(s).

According to embodiments of the present disclosure, multiple template methods may be maintained and used for instrumenting different methods and types of software application code. In an embodiment, the present systems and methods may first determine which target method(s) should be instrumented, select which template(s) should be used to instrument the target method(s), and perform the instrumentation, for example just prior to just-in-time (JIT) compilation by a JIT compiler. In an embodiment, different templates are pre-created to fit within different general categories. Some examples of such categories include database applications, web services, socket connections, and a general catch-all category. The number of categories may range from just a few to hundreds or more, as will be recognized by those skilled in the relevant art(s). The template method(s) may be alternatively referred to as "copy-from" methods, but for the sake of simplicity will be referred to herein as "template" methods.

As shown in FIG. 1A, example network environment 100 includes a plurality of user terminals 102.1 through 102.n, a network 104, and a server 106. In an embodiment, the plurality of user terminals 102.1 through 102.n may be personal computing devices, such as desktop computers, laptop computers, tablet computers, mobile phones, PDAs, just to name a few examples, or any combination of the above. A user terminal, such as user terminal 102.1, may initiate a transaction request to server 106. The user of user terminal 102.1 may be a human. Alternatively, the user may be any computer or application capable of requesting the use of computing resources on the server 106. For example, the request may be based on the user's browsing of a particular website, use of a cloud computing service, or some other remote application as will be understood by a person skilled in the relevant art(s).

The user terminal 102.1 may transmit the transaction request to the server 106 via a network 104. The user terminal 102.1 may connect to the network 104 via a connection 150, and the server 106 may connect to the network 104 via a connection 152. In one example, the network 104 may be the Internet connecting the server 106, e.g. a web server, to the user terminal 102.1. The network 104 may alternatively be an intranet, such as a local area network (LAN). The user terminal 102.1 may communicate with the server 106 using a variety of different communications protocols as will be recognized by those skilled in the relevant art(s). The server 106, generally, may be any type of computing device configured to perform processing tasks on behalf of a user.

In an alternative example, the server 106 may house a database which receives queries from user terminals 102.1 through 102.n. In such an example, the user terminals 102.1 through 102.n may be located within the same vicinity as the server 106, for example behind a common firewall in an intranet, or may be located remotely from the server 106 and may connect to the server 106 via a virtual private network (VPN) or via an unsecured connection, as will be understood by those skilled in the relevant art(s).

In an embodiment, the server 106 may include an application monitoring system for monitoring the performance of the software application(s) used for processing the transaction request from user terminal 102.1. One exemplary embodiment of the server 106 is depicted in FIG. 1B. The server 106 may include one or more processors 108. The one or more processors 108 may each include one or more processing cores, capable of performing parallel or sequential operations, for example by use of threads. Server 106 may also include a transceiver 110, for example an Ethernet connection, WiFi connection, or other connection capable of enabling the server 106 to transmit and receive data to/from external sources, such as user terminals 102.1 to 102.n of FIG. 1A. The server 106 may include a data store 112, for example a hard drive, flash drive, or other types of memory as will be understood by persons skilled in the relevant art(s). The data store 112 may store the application(s) used in completing the transaction request.

When the server 106 starts the software application(s) necessary to complete the transaction request from user terminal 102.1, the server 106 may load a first application module of the software application with an analysis module 114. The analysis module 114 may analyze each module of the software application at different times to determine which methods within each module may be subject to subsequent instrumentation and monitoring. These methods are described herein as "target methods," as will be discussed in more detail below. For those methods selected for monitoring, the instrumentation module 116 may instrument the target method(s) according to the different embodiments below. As will be recognized by those skilled in the relevant art(s), the analysis module 114 and/or the instrumentation module 116 may be implemented as hardware, software, or a combination of both to achieve their respective functions.

Data that is output from the instrumented methods may be in the form of trace files and can be stored, in one example, in the data store 112. Alternatively or in addition, the trace files may be transmitted and stored in another data store at another server or mass storage device, as will be recognized by those skilled in the relevant art(s). The data in the trace files may be used to analyze performance metrics and trace transactions.

Figure 16:
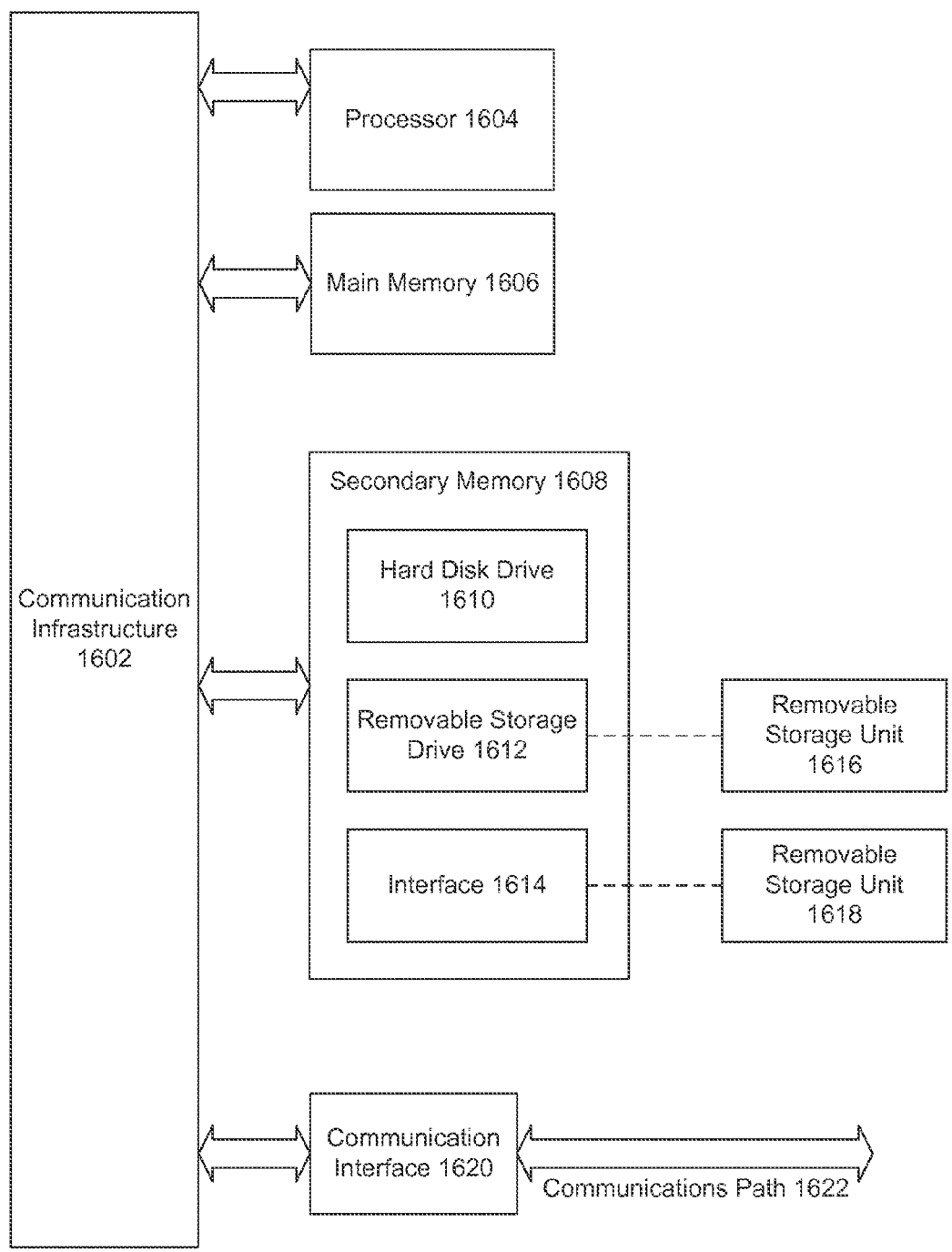
FIG. 16 illustrates an exemplary computer system that can be used to implement aspects of embodiments.

An exemplary embodiment of server 106 will be discussed in further detail below with respect to FIG. 16. As will be recognized by those skilled in the relevant art(s), the different functions of server 106 depicted in FIG. 1B may be performed wholly within the server 106, or alternatively may be performed by a plurality of different servers or other types of computing devices operating in cooperation within a geographic vicinity of each other or at geographically different locations.

Figure 2:
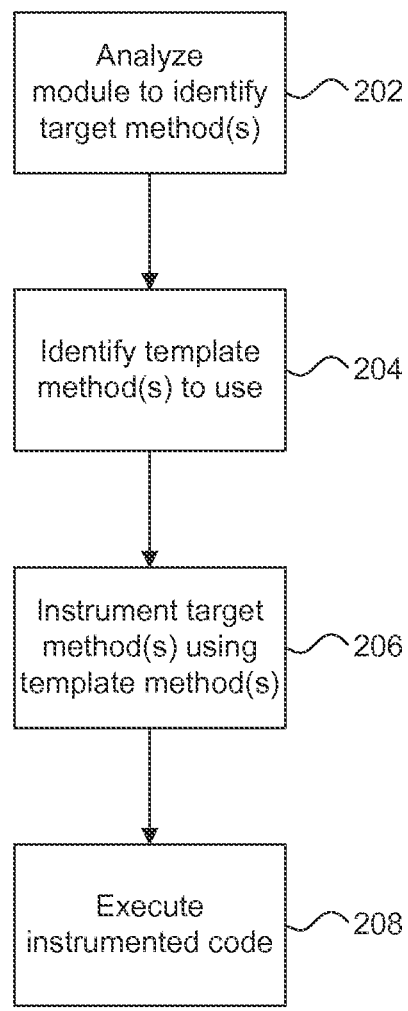
FIG. 2 illustrates an exemplary flowchart of a process for analyzing and instrumenting application code according to an embodiment.

FIG. 2 illustrates an exemplary flowchart of a process 200 for analyzing and instrumenting software application code according to an embodiment. Process 200 provides a high-level view of an exemplary embodiment which will be discussed in more detail in subsequent figures. Although the exemplary process 200 may be performed on any number of computing devices, the following figures will be described with respect to the server 106 of FIGS. 1A and 1B, by way of nonlimiting example. For purposes of the present discussion, it is assumed that a transaction request has already been received, for example from user terminal 102.1.

At step 202, the server 106 loads and analyzes the first application module of the software application that will be used to process the received transaction request. In an embodiment, the server 106, for example by way of the analysis module 114, determines whether the first application module has been analyzed and the results cached previously. If so, the analysis module 114 may load the cached analysis. Otherwise, the analysis module 114 may step through each class and method in the first application module to identify target method(s) of interest for possible instrumentation. The analysis which the server 106 performs will be discussed in more detail with respect to FIG. 3 below.

At step 204, the server 106, using the results of the analysis of step 202, identifies which template method(s) should be used to instrument the target method(s). In an embodiment, the analysis module 114 identifies the template method(s) and retrieves them from storage, for example from data store 112. In an embodiment, there may be a variety of templates available for different categories, such as the database, web services, socket connections, and catch-all categories mentioned above. In addition, new templates may at any time be created for additional categories or sub-categories, for example when a new Application Programming Interface (API) is introduced to the system.

At step 206, the server 106 instruments the target method(s) using the template method(s) retrieved from storage, such as from data store 112. Instrumenting a target method will be discussed in more detail with respect to FIGS. 4-15 below. Generally, the server 106, by way of instrumentation module 116 for example, may convert the byte code of the target method to a list, such as a linked list, of pseudo-instructions where any branch target offsets between instructions are replaced by pointers to those destination nodes. In this manner, the original offset values become irrelevant during the instrumentation process and the computational cost and time is decreased. The same conversion to a list occurs with the template method. The target method, in linked list form, is then inserted between prolog and epilog of the template method in linked list form. All of the instructions may then receive newly-computed offsets, and the pointers may be replaced with new branch target offsets to the newly-computed offsets. The instrumented method may then be converted back to byte code.

At step 208, the instrumented method may be sent to a compiler for compilation, for example JIT compilation in the CLR environment, when the byte code is converted to machine code and executed. After compilation and during runtime, the instrumented method may output data which is recorded to trace files. This data is used for monitoring transactions and/or analyzing performance of the instrumented method(s).

The steps 202 through 208 of process 200 may be repeated for each subsequent module of the software application that may be loaded during operation of the software application at the server 106 in response to the transaction request.

Figure 3:
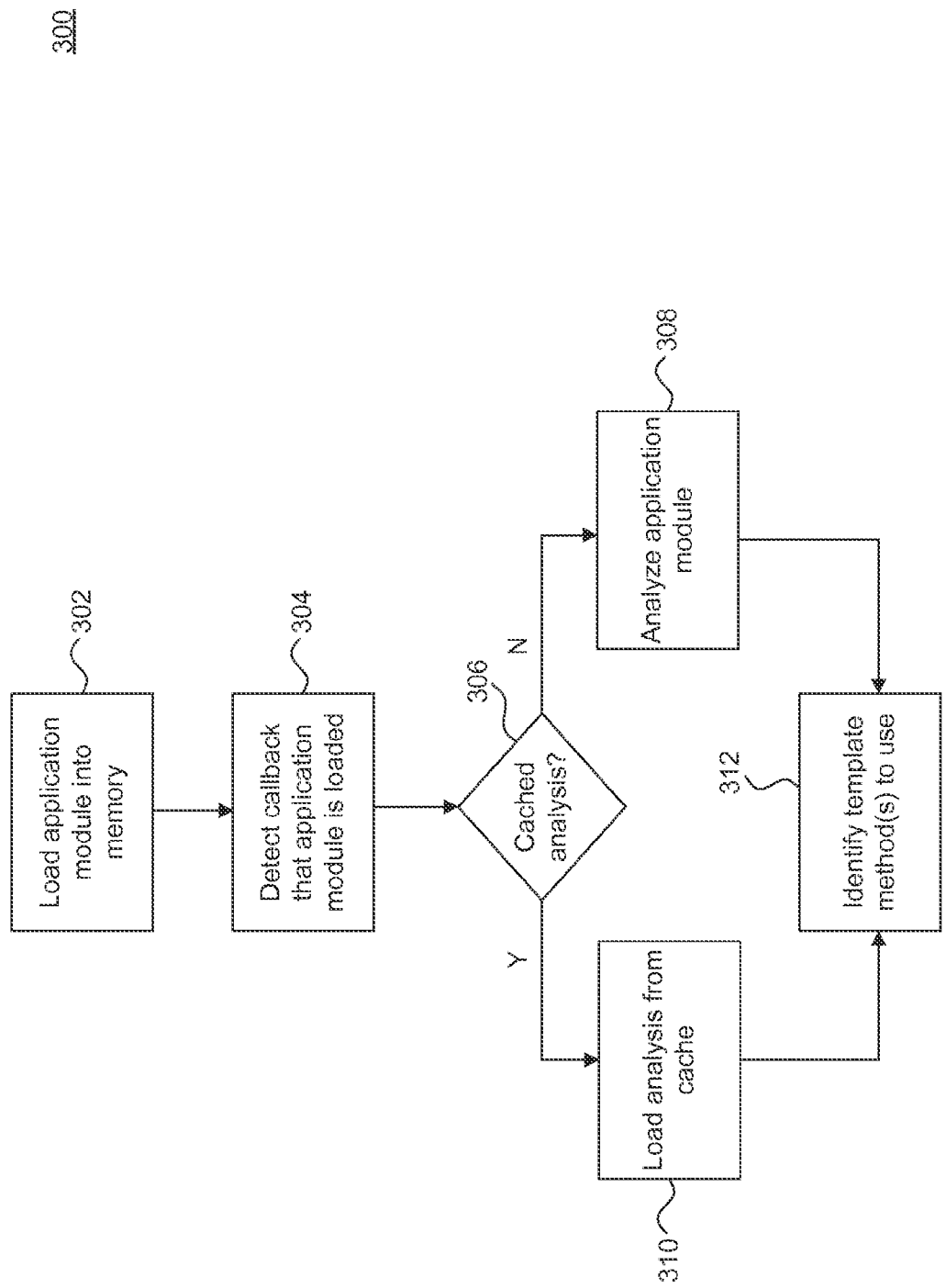
FIG. 3 illustrates an exemplary flowchart of a process for analyzing an application code module according to an embodiment.

FIG. 3 illustrates an exemplary flowchart of a process 300 for analyzing an application module, according to an embodiment. The application module may be a module of a software application used in processing a transaction request from a user by a server. Process 300 may be an embodiment of step 202 of FIG. 2. Process 300 beings at step 302, in which the application module is loaded into memory, such as data store 112, as discussed above with respect to FIG. 2.

At step 304, the analysis module 114 receives a callback indicating that the application module has been loaded into memory, for example provided by the CLR.

At decision step 306, the analysis module 114 determines whether the loaded application module has been previously analyzed by checking the cache. When the application module has been previously analyzed, the analysis module 114 stores an identifier of which template(s) to use when the application module is loaded again, such as at step 302. The identifier could range from a single-byte flag to a full string.

If the analysis module 114 determines at step 306 that the application module has not been previously analyzed, the analysis module performs the analysis at step 308. In this step, the analysis module 114 may inspect an object derivation tree for the class or classes that are about to be JIT compiled. If the class inherits a particular interface or interfaces that are on a list of interfaces of interest (e.g., which map to a particular category or categories of templates as described above), the analysis module 114 may determine that those interfaces should be instrumented. Additionally or alternatively, the analysis module 114 may analyze the body of one or more of the methods within the class or classes to identify certain instructions of interest. These instructions of interest may be instructions that, when called, call delegate methods which are a way to indirectly access another method. The analysis module 114 may identify the target of a delegate call. The analysis module 114 may then mark the target method of the delegate call to use a specific template method for instrumentation, whenever that target method of the delegate call may be later called. In an embodiment, the analysis module 114 may enumerate all of the method types within the application module and identify whether each method should be instrumented.

Alternatively if, at decision step 306, the analysis module 114 determines that the application module has been previously analyzed, the analysis module 114 may load the stored analysis results from the cache at step 310.

Under either alternative, at step 312 the analysis module 114 identifies the template method(s) to use for instrumenting the target method(s) based on the analysis results, whether cached or newly generated. For example, the analysis module 114 may review each identified method and determine which template method should be used for that identified method. The results of the analysis and identification of template methods may then be stored or re-written to the cache for future use. In this manner, the hierarchy of each module only has to be traversed once at load time, which reduces the computational load during run time of the application code.

Figure 4:
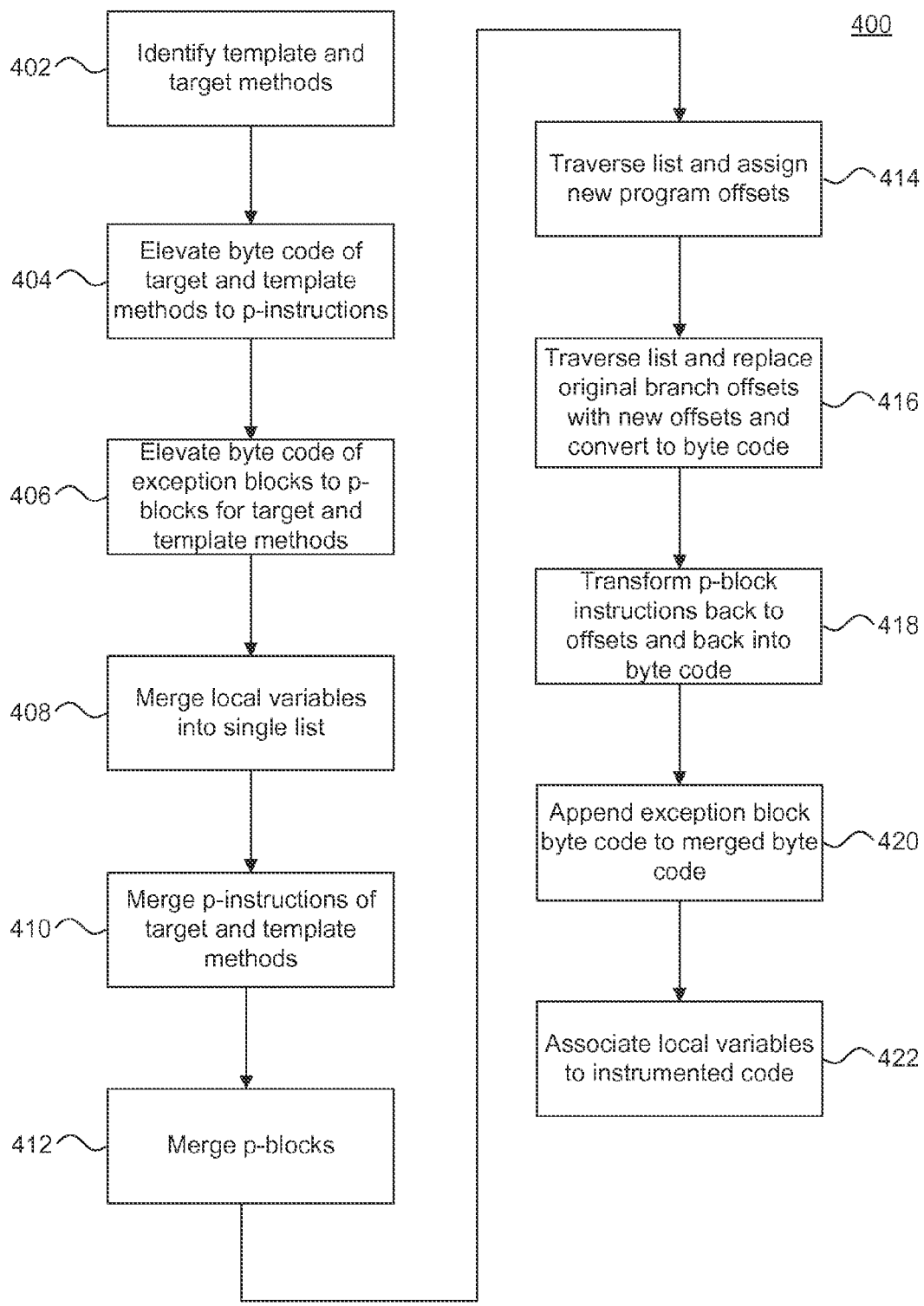
FIG. 4 illustrates an exemplary flowchart of a process for instrumenting application code according to an embodiment.

FIG. 4 illustrates an exemplary flowchart of a process 400 for instrumenting application code according to an embodiment. Process 400 can be an embodiment of step 206 of FIG. 2. The discussion of FIG. 4 will include reference to FIGS. 5 through 15. For simplicity of discussion, the following steps will be described with respect to a single target method and a single corresponding template method, although multiple target and template methods may be identified and used at any given time as will be recognized by those skilled in the relevant art(s). In an embodiment, the instrumentation module 116 may perform the steps discussed below.

Process 400 begins at step 402, in which the instrumentation module 116 identifies the target method identified in the analysis process of FIG. 3, along with the template method determined to correspond with the target method, for example by communicating with the analysis module 114. In an embodiment, the analysis module 114 may have identified a plurality of target methods for instrumentation, in which case the instrumentation module 116 identifies the plurality of template methods determined to correspond with the plurality of target methods. For the sake of simplicity, discussion will focus on the single target method and single template method identified, though it will be recognized that the same steps will apply to a plurality of methods.

Figure 5:
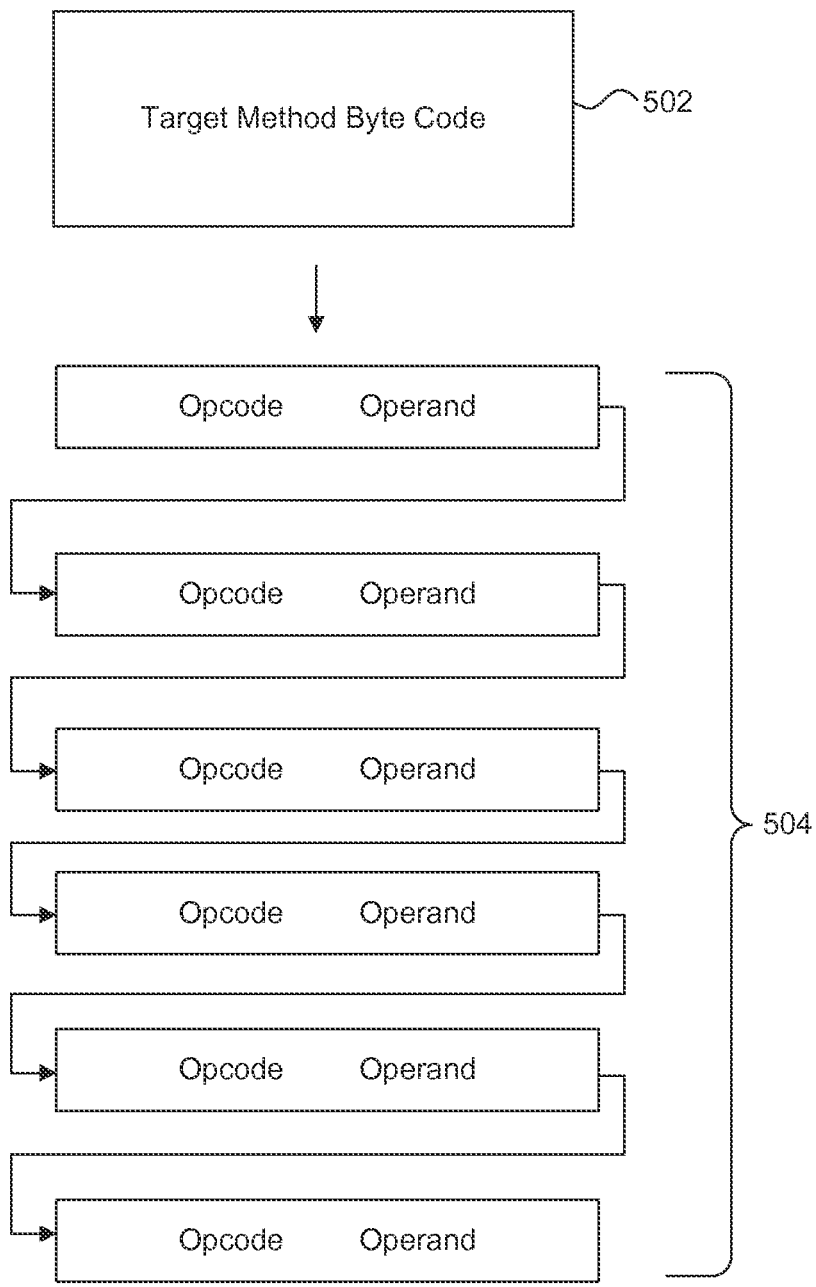
FIG. 5 illustrates an exemplary conversion of a target method's byte code to a linked list according to an embodiment.
Figure 6:
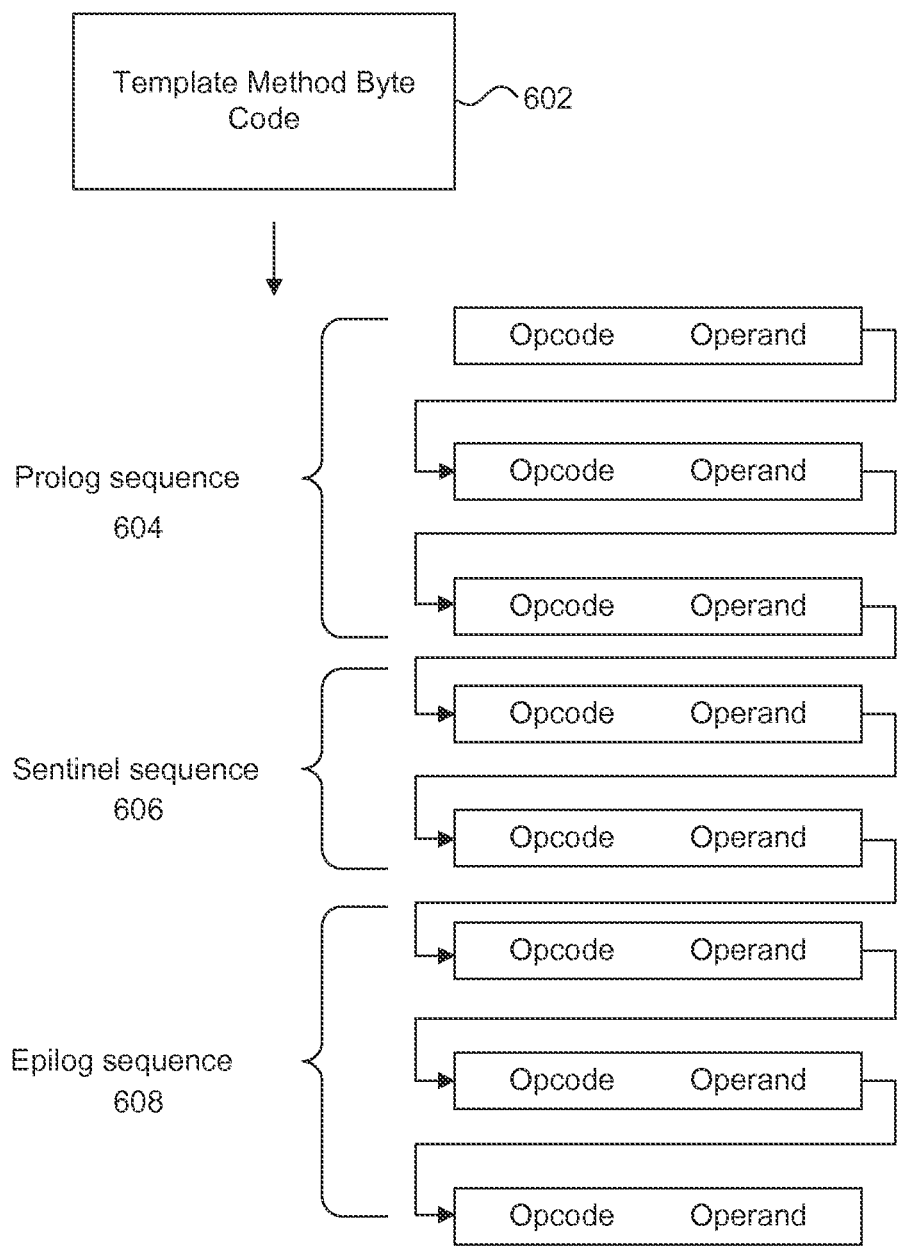
FIG. 6 illustrates an exemplary conversion of a template method to a linked list and of instruction branch target offsets to pointers to target instructions according to an embodiment.
Figure 7:
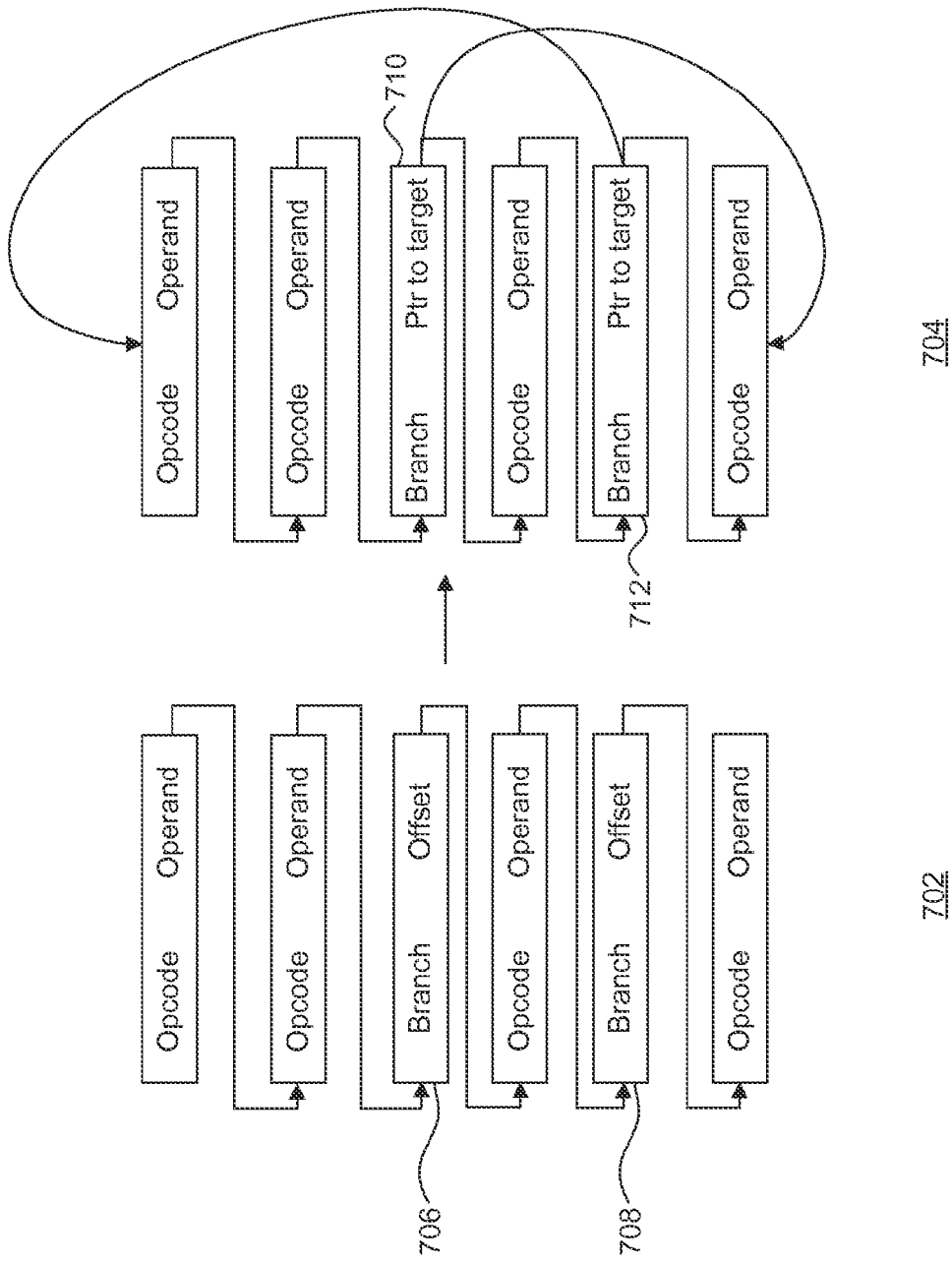
FIG. 7 illustrates an exemplary conversion of target instruction branch target offsets to pointers to target instructions according to an embodiment.

At step 404, the byte code of the target method is elevated to pseudo code, or pseudo-instructions as they will be referred to herein, to form a target instruction list. FIG. 5 illustrates the elevation of a target method byte code 502 to a target instruction list 504. As shown in FIG. 5, target instruction list 504 is a linked list of objects that encapsulate opcodes and operands. The byte code of the template method is similarly elevated to pseudo-instructions to form a template instruction list, for example a linked list of opcodes and operands as shown in FIG. 6. According to embodiments of the present disclosure, the byte code of the template method includes a prolog sequence 604, a sentinel sequence 606, and an epilog sequence 608. These sequences are retained after conversion from template method byte code 602 to the template instruction list composed of sequences 604, 606, and 608. Before elevation, the sentinel sequence 606 includes a unique byte sequence of instructions that permits the instrumentation module 116 to identify the sentinel sequence 606. The instrumentation module 116 will use this unique sequence of instructions, after elevation, as the point to merge the target instruction list 504 between the prolog and epilog sequences 604 and 606 of the template instruction list.

Where the target method and/or template method included branch target offsets, these branch target offsets are replaced by pointers. Each pointer points to the node of the linked list that corresponds to the original byte code before elevation, for example as depicted in FIG. 7. FIG. 7 provides a general illustration of the conversion of jump or branch target offsets (referred to herein collectively as branch target offsets for simplicity of discussion) in linked list 702 to pointers in linked list 704. Linked list 702 has two instructions, 706 and 708, with branch target offsets. These offsets are converted to pointers in instructions 710 and 712 in linked list 704. In this manner, the branch target offset value becomes irrelevant during the rest of the instrumentation process because the pointer maintains the interrelationship without requiring repeated re-computations. In an embodiment, the instrumentation module 116 converts the branch target offsets to pointers during the same time as the elevation of the byte code to the linked list. As will be recognized by those skilled in the relevant art(s), this may also be performed after the elevation to the linked lists has been performed as a subsequent step on the new linked lists for both the target and template methods, whenever either has branch target offsets.

Figure 8:
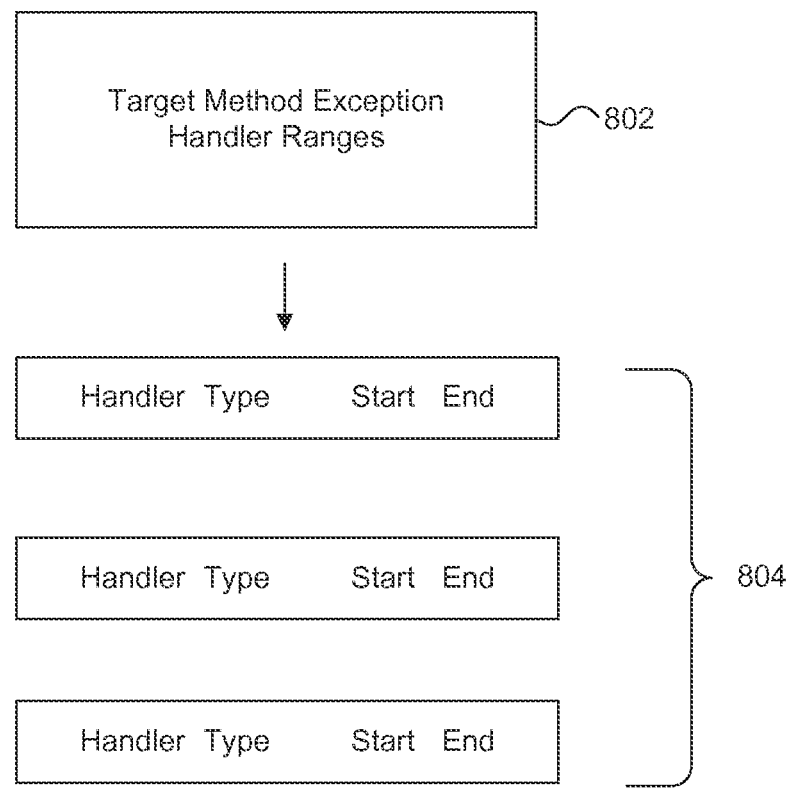
FIG. 8 illustrates an exemplary conversion of a target exception block's byte code to a list of exception blocks according to an embodiment.
Figure 9:
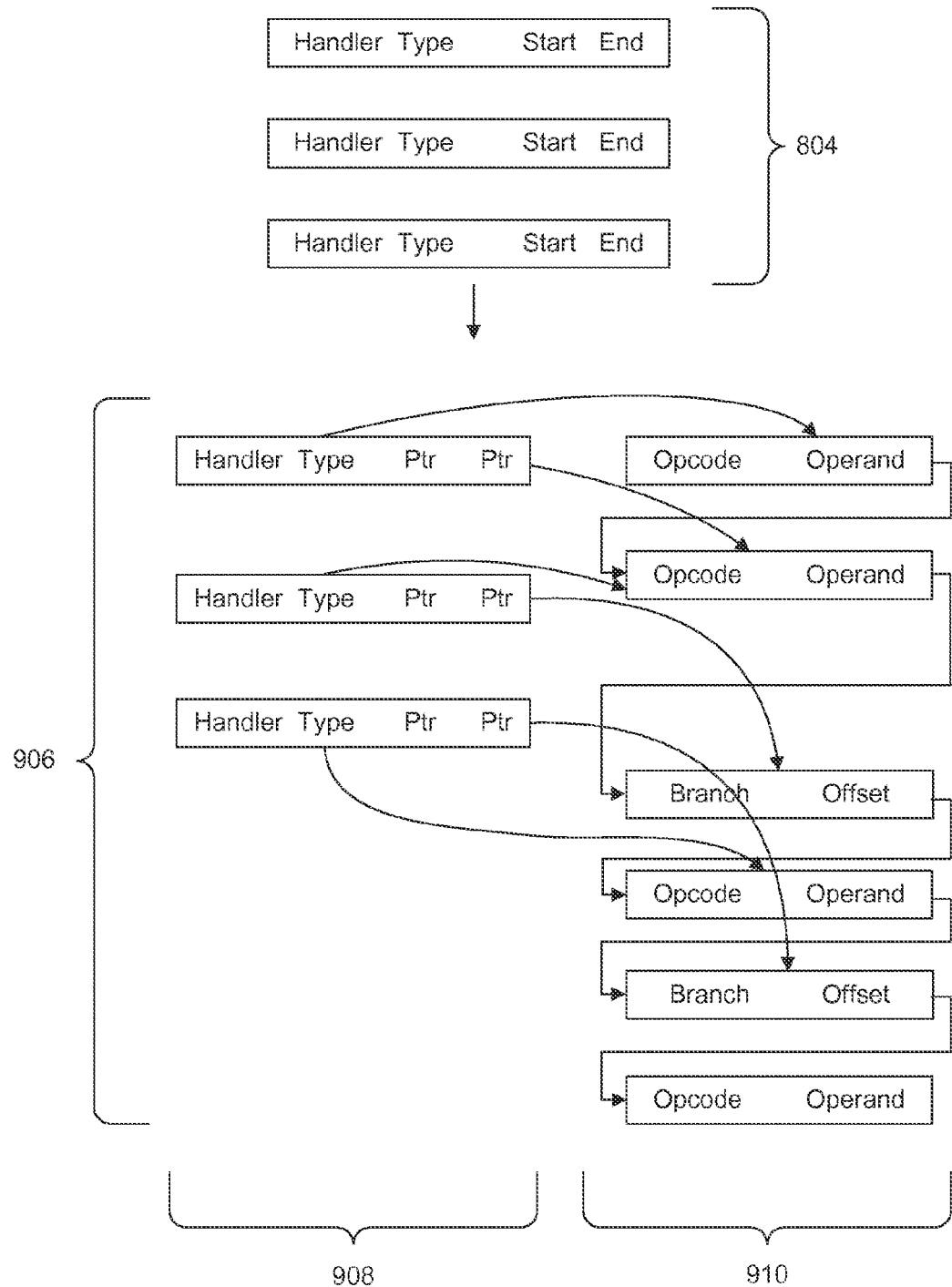
FIG. 9 illustrates an exemplary conversion of target exception block start or end offsets to pointers to target instructions according to an embodiment.

Returning to FIG. 4, at step 406 the byte code of exception block(s) of the target method is elevated to an intermediate pseudo-exception block representation, referred to herein as pseudo blocks. In an embodiment, the exception block may consist of try-catch and try-finally pairs, although other exception handler ranges are possible as will be recognized by those skilled in the relevant art(s). In the resulting pseudo block(s), the ranges of try, handler, and finally blocks may be replaced by pointers to corresponding nodes of instructions in each pseudo-instruction list for the target and template methods. This is graphically illustrated in FIGS. 8 and 9. In FIG. 8, the target method exception handler ranges 802 are elevated to a list of pseudo blocks 804, where each pseudo block includes a handler and a start and end range. FIG. 9 illustrates the replacement of the try, handler, and finally offsets of pseudo blocks 804 with pointers in list 908 to the corresponding nodes of instructions in the linked list 910. Linked list 910 may represent the target instruction list 504. As a result, if linked list 910 is modified, the pointers in the pseudo blocks 804 would still point to the originally intended instructions.

The exception block(s) of the template method are similarly elevated to pseudo blocks, where the ranges are replaced by pointers to the corresponding instructions in the template instruction list that includes sequences 604, 606, and 608 as discussed with respect to FIG. 6 above.

In embodiments that occur within the .NET environment, which uses a token and table-based system exception class, tokens related to the exception blocks may have to be adjusted due to the new context. For example, these tokens may reference classes and methods that are external or internal to the template method they are found in. These references are relative to the context of the template method they are found within. For example, if there are any exceptions that catch in the template method, there would be a corresponding exception class token specific to the context where the template method exists. That token may need to be updated once the methods are merged so the references are relative to the application module, because the context changes from the template method to the application module containing the target method being instrumented.

Figure 13:
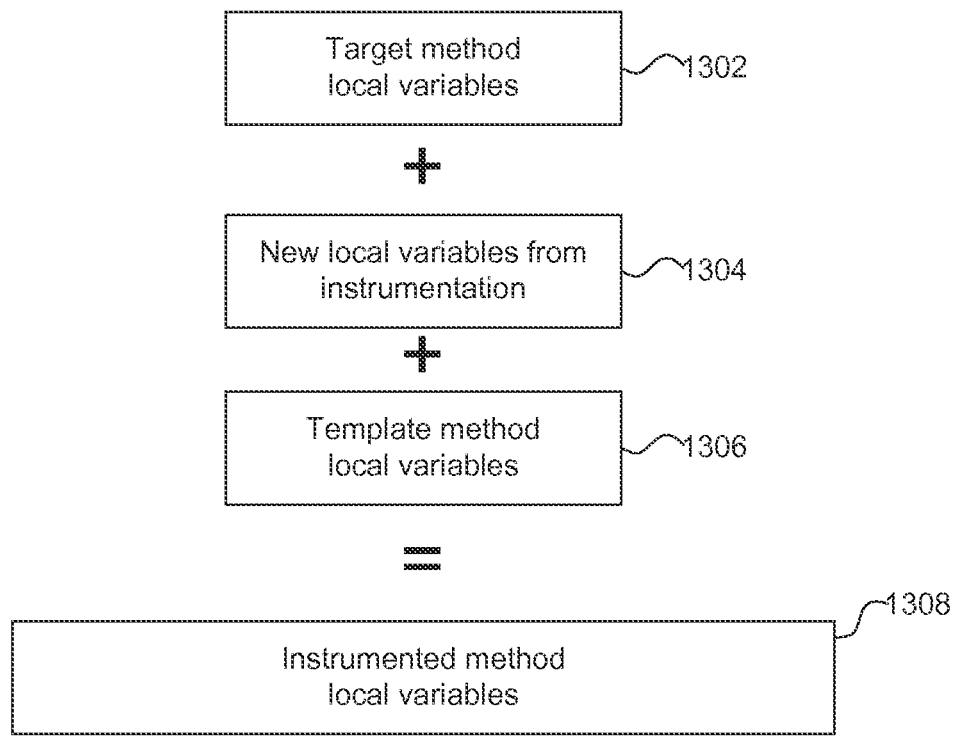
FIG. 13 illustrates an exemplary computation of local variables after merging, according to an embodiment.

Returning to process 400, at step 408 local variables of the target and template methods are merged into a single local variables list. In an embodiment, the list of local variables for the template method is appended to the list of local variables for the target method. This is because local variables are addressed in the instruction stream by their relative position in their respective lists, and there are typically more local variables associated with the target method than with the template method. This is depicted in FIG. 13, where the template method local variables 1306 are appended to the target method local variables 1302. In an embodiment, new local variables may result from the process of instrumentation itself. Where this occurs, the new local variables 1304 may be appended to the target method local variables 1302, followed by the template method local variables 1306. This combination of local variables results in the instrumented local variable list 1308 in FIG. 13.

In this manner, the instructions in the target instruction list 504 which reference local variables require no adjustment, while instructions in the template instruction list, which includes sequences 604, 606, and 608 that reference local variable indices, will be offset by the number of local variables in the target instruction list 504. For example, where the target instruction list 504 includes n local variables, the local variables for the template instruction list are appended by adding n to the index value of each local variable for the template instruction list. The local variable list of the target instruction list 504 may alternatively be appended to the local variable list of the template instruction list that includes sequences 604, 606, and 608.

In embodiments that occur within the .NET environment a signature blob, which represents all local variable types in the corresponding method, may be updated. This may include updating all type, field, and method tokens referenced in the newly created signature blob resulting from the combined local variable list.

Figure 10:
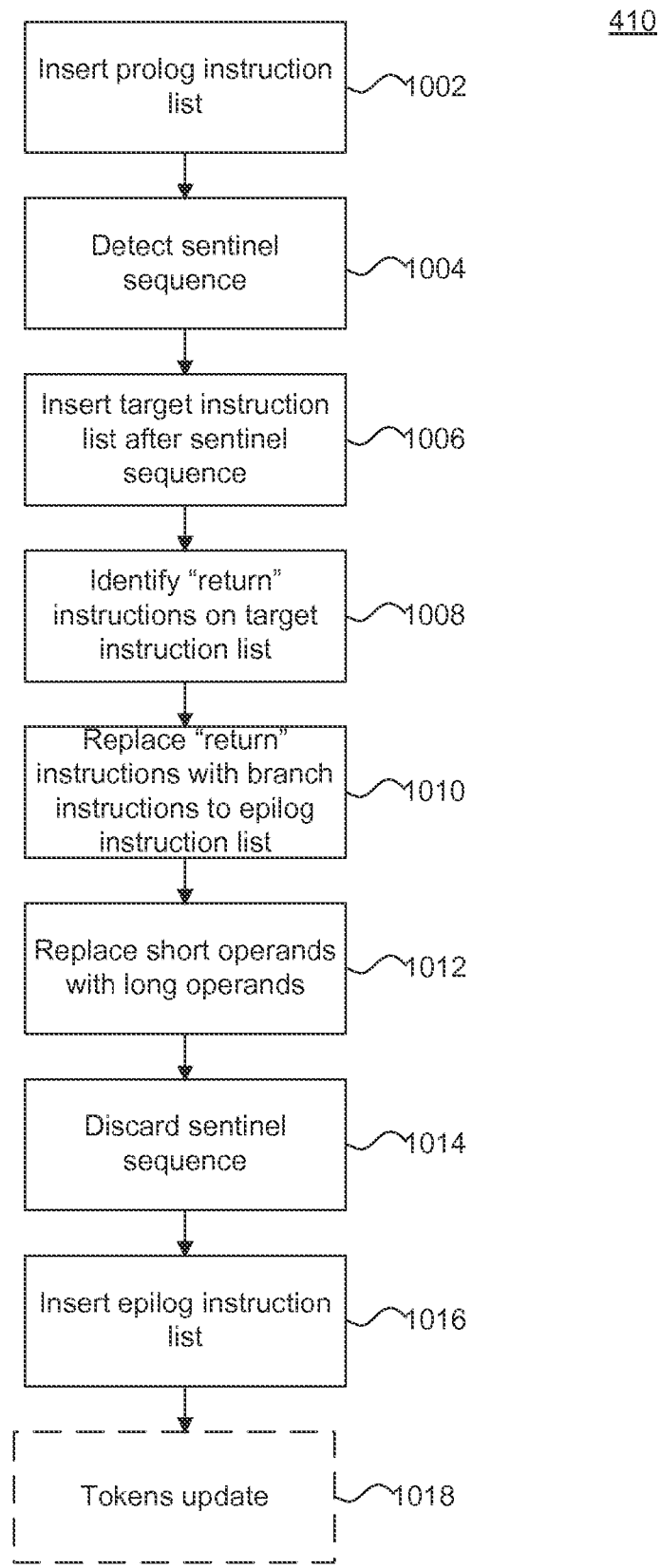
FIG. 10 illustrates an exemplary flowchart of a process for merging target and template linked lists according to an embodiment.

At step 410, the pseudo-instructions in the target instruction list 504 are merged with the pseudo-instructions in the template instruction list that includes sequences 604, 606, and 608. This is illustrated in more detail in FIG. 10, which illustrates an exemplary flowchart of a process for merging target and template linked lists according to an embodiment. Discussion of FIG. 10 is made with reference to FIG. 11, which illustrates an exemplary merged linked list 1100 according to an embodiment.

At step 1002, the merged instruction list 1100 begins by inserting the prolog instruction list 1102, referenced above as prolog sequence 604.

After the prolog instruction list 1102 is inserted, at step 1004 the sentinel sequence 606 is detected. The sentinel sequence 606 may include a unique instruction sequence that enables its identification as the location at which to insert the target method that is being instrumented.

Figure 11:
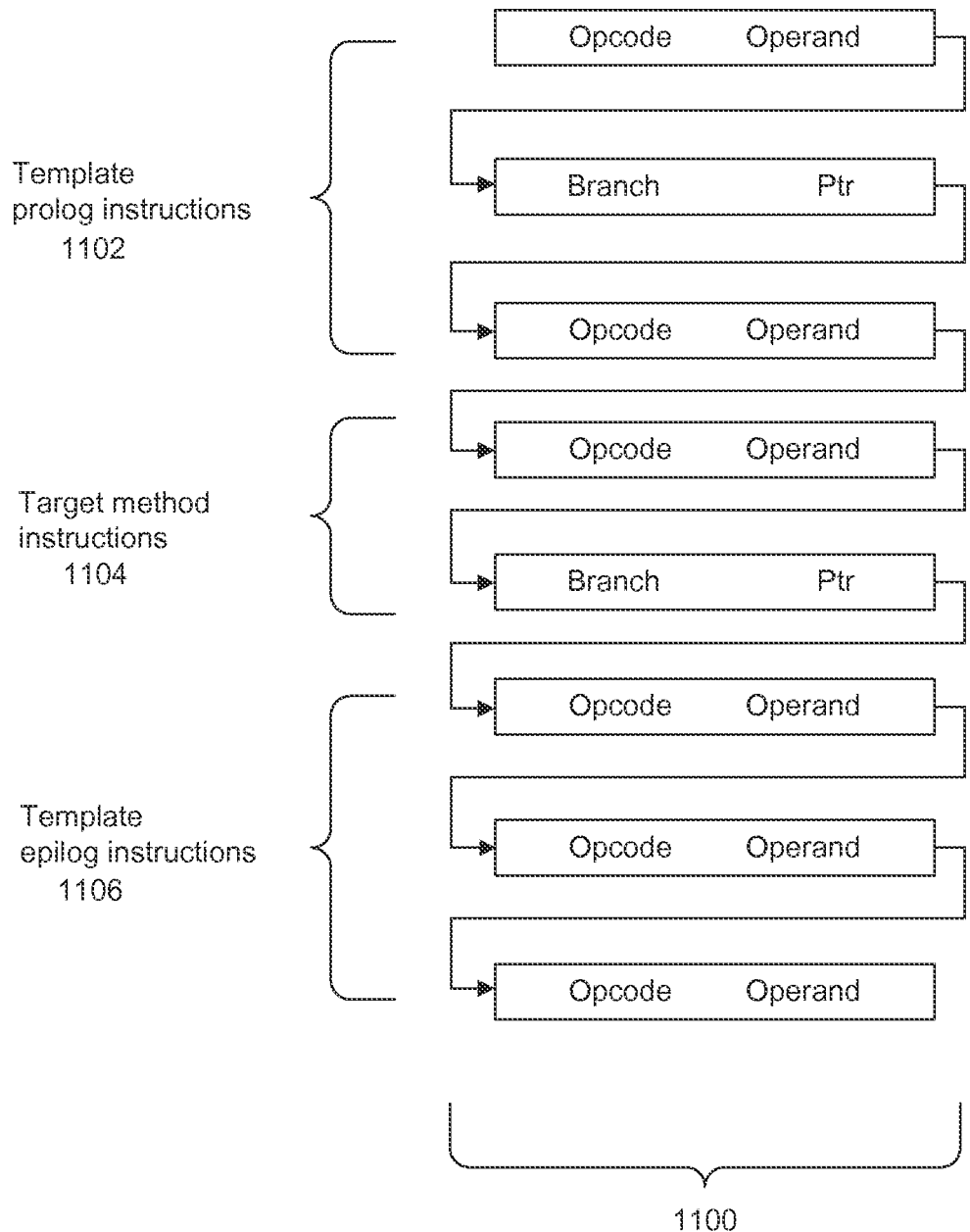
FIG. 11 illustrates an exemplary merged linked list according to an embodiment.

After detecting the sentinel sequence 606, at step 1006 the instrumentation module 116 may insert target instruction list 504, shown in FIG. 11 as target instruction list 1104, at the end of the prolog instruction list 1102.

At step 1008, any "return" pseudo-instructions in the target instruction list 1104 are identified. "Return" pseudo-instructions are identified, for example by instrumentation module 116, so they may be replaced by branch instructions, with corresponding pointers, to the first pseudo-instruction of the epilog instruction list 1106 that follows the sentinel sequence 606. In an embodiment, these "return" pseudo-instructions may be instructions that cause the target method to end. These are replaced with the pointers to the epilog instruction list 1106 so the instrumented method that results from this process does not prematurely end.

At step 1010, the "return" pseudo-instructions that were identified are replaced by the branch instructions to the epilog instruction list 1106, referenced above as epilog sequence 608, with the corresponding pointers.

At step 1012, any pseudo-instructions which have a short operand representation may be replaced by instructions that have a long operand representation. The use of short operand representation may occur, for example, in .NET environments where the compiler creates shorter instructions where possible.

Once the target instruction list 1104 has been appended to the prolog instruction list 1102, the sentinel sequence 606 may be discarded at step 1014. In an embodiment, this may take the form of replacing the unique instruction sequence that formed sentinel sequence 606 with "no-operation" pseudo-instructions.

Once the target instruction list 1104 is inserted, the instrumentation module 116 inserts the epilog instruction list 1106 after the target instruction list 1104 at step 1016.

At step 1018, and as discussed above with respect to FIG. 4, any tokens in any of the instruction sequences may be updated. This may be done, as required, to reflect the new context in which they are located.

In this manner, a single merged instruction list 1100 results that contains the pseudo-instructions from both the template and target methods.

Figure 12:
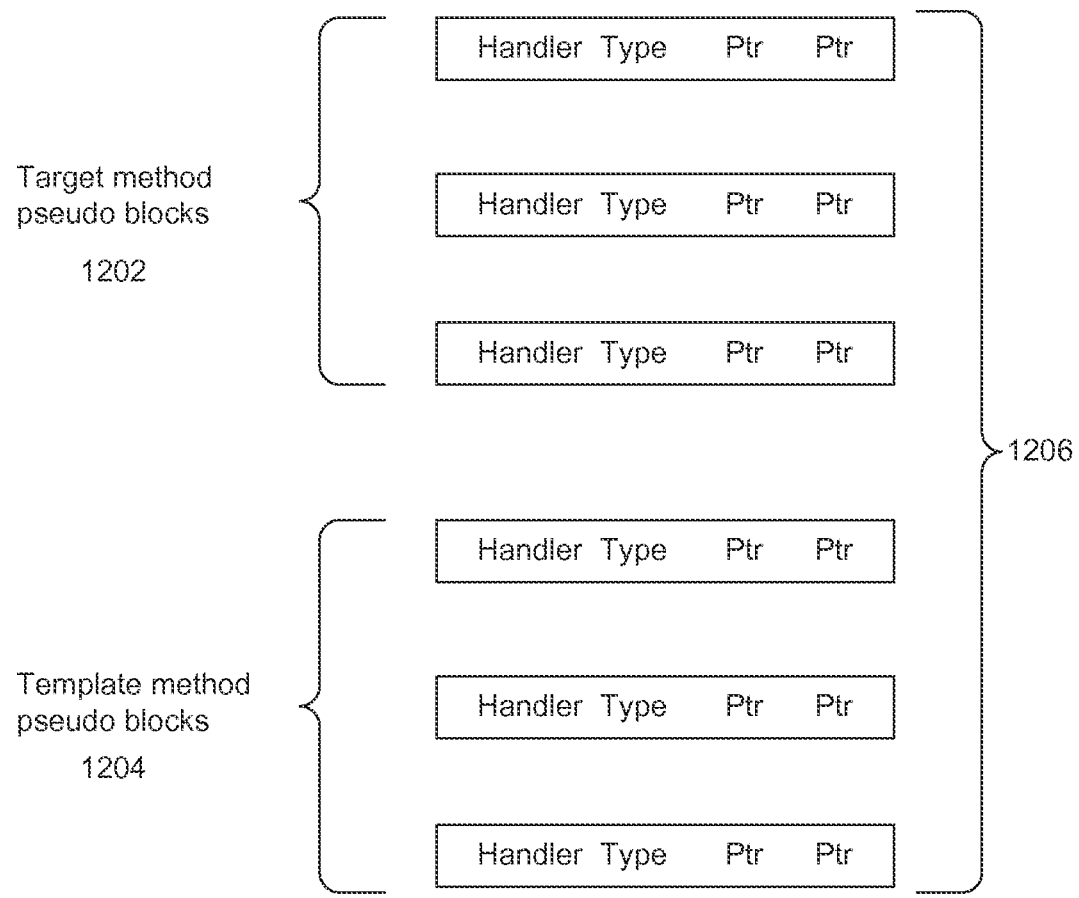
FIG. 12 illustrates exemplary merged exception blocks according to an embodiment.

Returning now to FIG. 4, at step 412, the pseudo blocks 804 of the target instruction list 1104 are merged with the pseudo blocks of the template instruction list after completing the merge of the pseudo-instruction linked lists in step 410. In an embodiment, the template pseudo blocks are appended to target pseudo blocks 804. In the merge, the pointers are retained to the branch targets in each exception block's lists. This results in proper nesting of the target pseudo blocks 804 within the pseudo blocks of the template method, reflecting the nesting of the pseudo-instruction list 1104 within the instruction lists 1102 and 1106 of the template pseudo-instructions. In an embodiment, the nesting is in order of outermost to innermost instruction lists. This is depicted in FIG. 12, which shows target method pseudo blocks 1202 preceding template method pseudo blocks 1204 in a merged context that results in a merged pseudo block 1206.

Although FIG. 4 illustrates the merging at step 410 occurring before the merging at 412, these may be done in any order as long as all of the merging is completed before conversion back to byte code, as discussed below.

At step 414, the instrumentation module 116 may traverse the now-merged linked list, for example a combination of the merged instruction list 1100 and the merged pseudo block 1206. In the traversal, the instrumentation module 116 assigns new program offsets to each pseudo instruction. In an embodiment, the new program offsets begin with an offset of zero and increase with each pseudo instruction.

At step 416, the instrumentation module 116 may again traverse the merged lists to replace the original branch target offset pointers with modified or new branch target offsets that reflect the newly-assigned program offsets resulting from step 414. After replacing the pointers with the new offsets, the merged instruction list 1100 may be converted back to a merged instruction byte code sequence and written to a byte stream output buffer.

Figure 14:
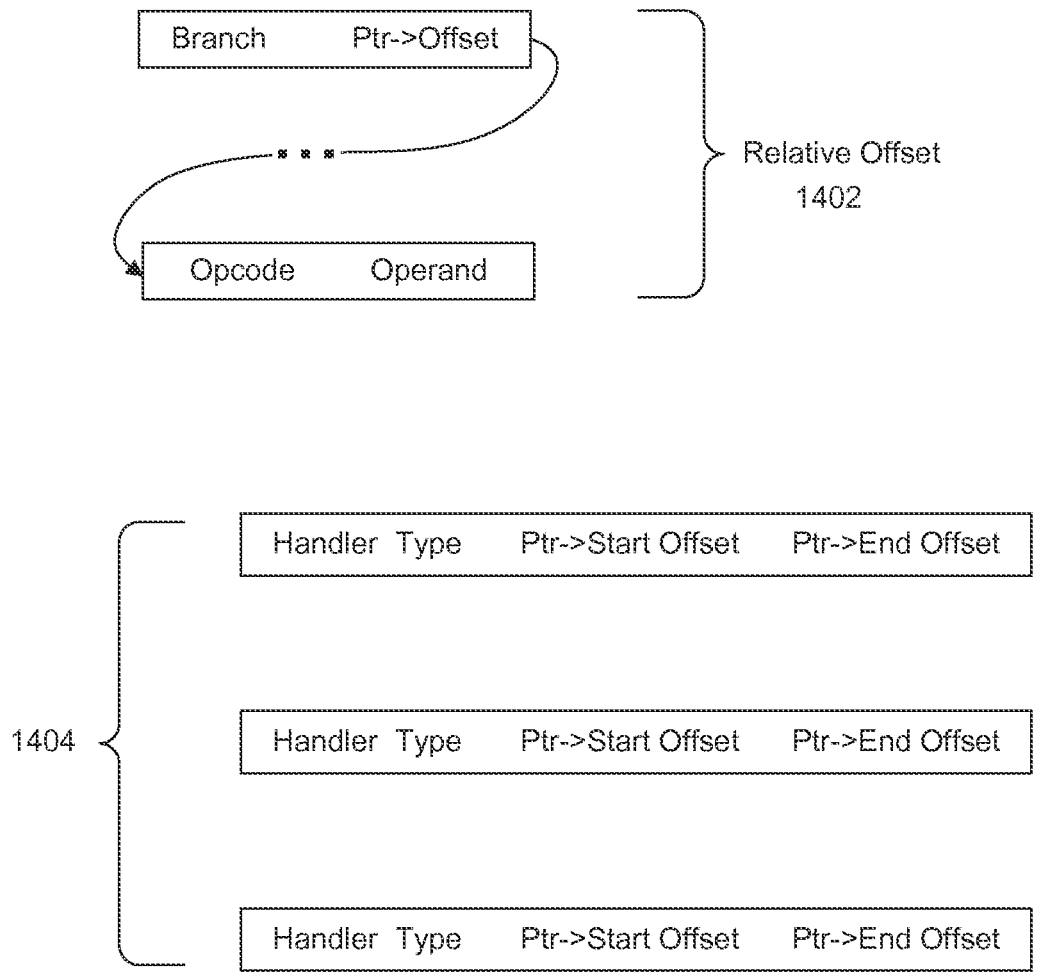
FIG. 14 illustrates an exemplary conversion of pseudo-instructions to instructions with re-calculated offsets to instructions, according to an embodiment.

At step 418, the instrumentation module 116 may also calculate new branch and exception handler offsets from the relative offsets in the pointers, depicted as relative offsets 1402 in FIG. 14. These pointers in the relative offsets 1402 may be replaced by new offsets shown in the exception blocks 1404 of FIG. 14. In step 418, the starting and ending pseudo-instructions for each region of each pseudo block may be replaced by the new offsets. Each pseudo block may then be converted back to original block form as a merged exception block byte code sequence.

At step 420, the merged exception block byte code sequence may be appended to the merged instruction byte code sequence to form the instrumented byte code.

At step 422, the instrumented local variable list 1308 may be associated with the instrumented byte code, for example by summarizing the local variable list in a header of the instrumented byte code. In embodiments using the .NET environment, a token or set of tokens representing the instrumented local variable list 1308 is added to a header of the instrumented byte code, which associates the instrumented method with the updated local signature blob discussed above. Further, the size of the instrumented method may be summarized and added to the header of the instrumented method.

Steps 416 and 418 may occur simultaneously to each other or in sequential order. Further, the conversion back to byte code may separately occur for the merged instruction list 1100 and the merged pseudo block 1206, as described with respect to steps 416 through 422. Alternatively, the instrumentation module 116 may calculate the new offsets and replace the pointers with the new branch target offsets for both the merged instruction list 1100 and the merged pseudo block 1206 before converted both back to byte code, together with the instrumented local variable list 1308 in a single step. This is illustrated in FIG. 15, where the full list 1502, including both the merged instruction list 1100, the merged pseudo block 1206, and the instrumented local variable list 1308, is converted back to instrumented byte code 1504 as the instrumented method.

Figure 15:
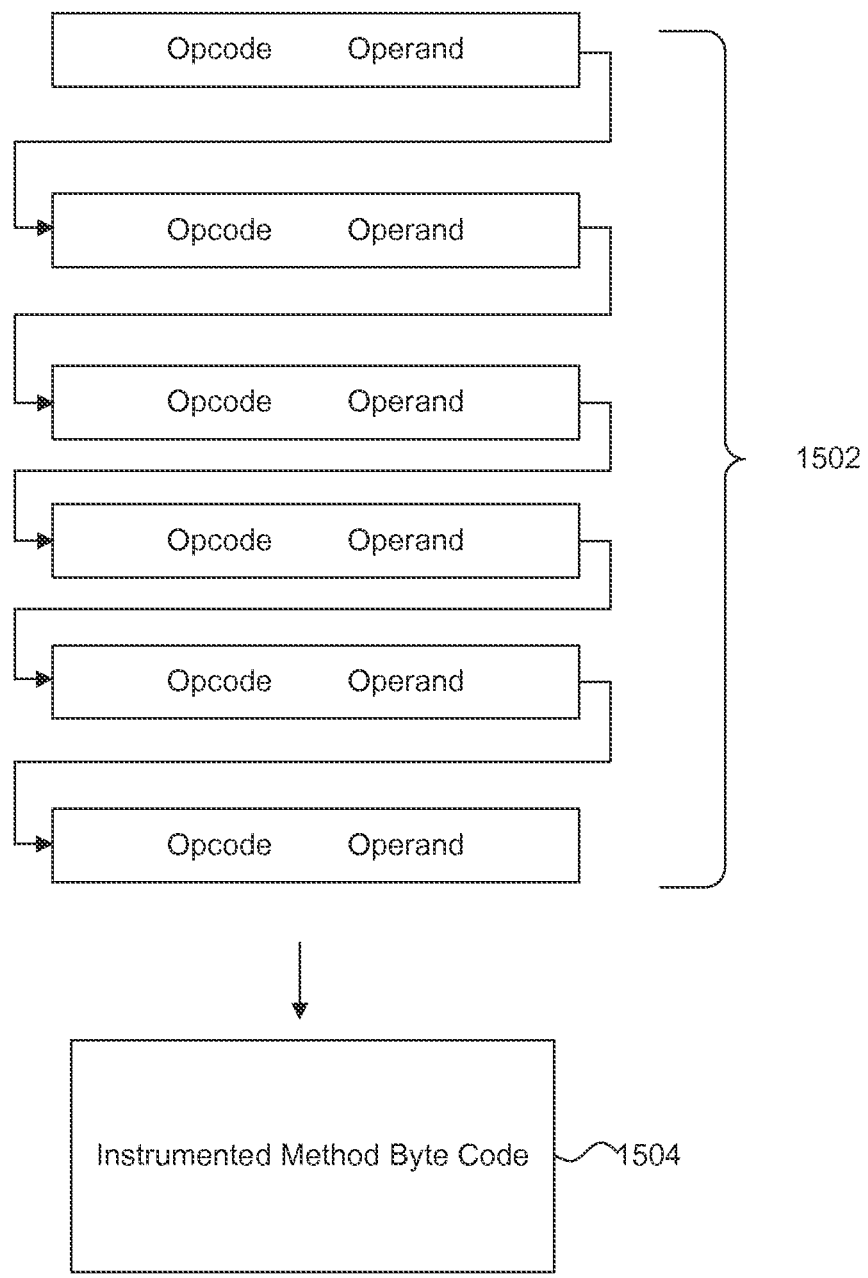
FIG. 15 illustrates an exemplary conversion of an instrumented method's linked list to byte code according to an embodiment.

The instrumented byte code 1504 depicted in FIG. 15 may then be passed on to the JIT compiler for compilation and execution. In an embodiment, target methods are re-instrumented each time they are accessed for JIT compilation. Alternatively, after a target method is instrumented, the instrumented sequence may be cached for future re-use. In any event, the template method used for instrumenting any particular target method is not modified in memory during any instrumentation process, so that the template method may be used again for other identified methods of interest in the same or different application modules.

In this manner, embodiments of the present disclosure avoid the expensive repeated analysis, re-computation, and alteration of branch target offsets while instrumenting application code in-line with the code.

Embodiments of the present disclosure can be implemented in hardware, software or as a combination of software and hardware. Consequently, embodiments of the disclosure may be implemented in the environment of a computer system or other processing system. An example of such a computer system 1600 is shown in FIG. 16. Embodiments described in FIGS. 1A or 1B may execute on one or more computer systems 1600. Furthermore, each of the steps of the processes depicted in FIGS. 2-4 and 10 can be implemented on one or more computer systems 1600.

Computer system 1600 includes one or more processors, such as processor 1604. Processor 1604 can be a special purpose or a general purpose digital signal processor. Processor 1604 is connected to a communication infrastructure 1602 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1600 also includes a main memory 1606, preferably random access memory (RAM), and may also include a secondary memory 1608. Secondary memory 1608 may include, for example, a hard disk drive 1610 and/or a removable storage drive 1612, representing a floppy disk drive, a magnetic tape drive, an optical disk drive, or the like. Removable storage drive 1612 reads from and/or writes to a removable storage unit 1616 in a well-known manner. Removable storage unit 1616 represents a floppy disk, magnetic tape, optical disk, or the like, which is read by and written to by removable storage drive 1612. As will be appreciated by persons skilled in the relevant art(s), removable storage unit 1616 includes a computer usable storage medium having stored therein computer software and/or data.

In alternative implementations, secondary memory 1608 may include other similar means for allowing computer programs or other instructions to be loaded into computer system 1600. Such means may include, for example, a removable storage unit 1618 and an interface 1614. Examples of such means may include a program cartridge and cartridge interface (such as that found in video game devices), a removable memory chip (such as an EPROM, or PROM) and associated socket, a thumb drive and USB port, and other removable storage units 1618 and interfaces 1614 which allow software and data to be transferred from removable storage unit 1618 to computer system 1600.

Computer system 1600 may also include a communications interface 1620. Communications interface 1620 allows software and data to be transferred between computer system 1600 and external devices. Examples of communications interface 1620 may include a modem, a network interface (such as an Ethernet card), a communications port, a PCM-CIA slot and card, etc. Software and data transferred via communications interface 1620 are in the form of signals which may be electronic, electromagnetic, optical, or other signals capable of being received by communications interface 1620. These signals are provided to communications interface 1620 via a communications path 1622. Communications path 1622 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1616 and 1618 or a hard disk installed in hard disk drive 1610. These computer program products are means for providing software to computer system 1600.

Computer programs (also called computer control logic) are stored in main memory 1606 and/or secondary memory 1608. Computer programs may also be received via communications interface 1620. Such computer programs, when executed, enable the computer system 1600 to implement the present disclosure as discussed herein. In particular, the computer programs, when executed, enable processor 1604 to implement the processes of the present disclosure, such as any of the methods described herein. Accordingly, such computer programs represent controllers of the computer system 1600. Where the disclosure is implemented using software, the software may be stored in a computer program product and loaded into computer system 1600 using removable storage drive 1612, interface 1614, or communications interface 1620.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method for instrumenting software code, comprising:
   converting a target method comprising a first byte sequence into a first linked list of corresponding first pseudo instructions and converting a template method comprising a second byte sequence into a second linked list of corresponding second pseudo instructions;
   replacing a first branch target offset in the first linked list with a first pointer and a second branch target offset in the second linked list with a second pointer;
   merging, by computer, the first linked list with the second linked list to form a merged linked list that is stored on a tangible computer-readable storage medium;
   assigning a new offset to each of the corresponding first and second pseudo instructions and replacing the first pointer and the second pointer with modified branch target offsets reflecting the new offset to each of the corresponding first and second pseudo instructions;
   converting a target exception block into a first pseudo exception block and converting a template exception block into a second pseudo exception block;

replacing a first start or end offset of the target exception block with a third pointer, the third pointer pointing to instructions corresponding to a target of the first start or end offset;

replacing a second start or end offset of the template exception block with a fourth pointer, the fourth pointer pointing to instructions corresponding to a target of the second start or end offset;

merging the first pseudo exception block with the second pseudo exception block to form a merged exception block, wherein the second pseudo exception block is appended to the first pseudo exception block;

assigning new offsets to corresponding pseudo instructions in the merged exception block; and replacing the third pointer and the fourth pointer with modified start or end offsets reflecting the new offsets to the corresponding pseudo instructions in the merged exception block.

2. The method of claim 1, wherein:

the second byte sequence comprises a prologue sequence, a sentinel sequence, and an epilogue sequence, the sentinel sequence being situated after the prologue sequence and the epilogue sequence being situated after the sentinel sequence; and the merging further comprises:

identifying the sentinel sequence in the second linked list; and inserting the first linked list at the start of the sentinel sequence and before the epilogue sequence of the second linked list.

3. The method of claim 1, further comprising:

converting the merged linked list into a third byte sequence, the third byte sequence comprising the first byte sequence and the second byte sequence with the modified branch target offsets;

wherein the third byte sequence comprises instrumented code.

4. The method of claim 1, further comprising:

appending a second local variable list corresponding to the template method to a first local variable list corresponding to the target method to form a single local variable list, the first local variable list having a first number of local variables; and offsetting an index associated with the second local variable list by the first number.

5. The method of claim 4, further comprising:

converting the merged linked list into a third byte sequence, the third byte sequence comprising the first byte sequence and the second byte sequence with the modified branch target offsets;

appending the merged exception block to the third byte sequence; and adding the single local variable list to a header of an instrumented method comprising the third byte sequence and the merged exception block.

6. The method of claim 1, further comprising:

loading an application module comprising the target method into a memory;

analyzing the application module to determine the target method to be instrumented;

identifying the template method to merge with the target method;

and storing an identifier indicating the template method, the identifier persisting until a change in the application module.

7. A non-transitory computer-readable storage medium having control logic recorded thereon that, when executed by a processor, causes the processor to perform a method for instrumenting software code in a processing server, the method comprising:

converting a target method comprising a first byte sequence into a first linked list of corresponding first pseudo instructions and converting a template method comprising a second byte sequence into a second linked list of corresponding second pseudo instructions;

replacing a first branch target offset in the first linked list with a first pointer and a second branch target offset in the second linked list with a second pointer;

merging the first linked list with the second linked list to form a merged linked list;

assigning a new offset to each of the corresponding first and second pseudo instructions and replacing the first pointer and the second pointer with modified branch target offsets reflecting the new offset to each of the corresponding first and second pseudo instructions;

converting a target exception block into a first pseudo exception block and converting a template exception block into a second pseudo exception block;

replacing a first start or end offset of the target exception block with a third pointer, the third pointer pointing to instructions corresponding to a target of the first start or end offset;

replacing a second start or end offset of the template exception block with a fourth pointer, the fourth pointer pointing to instructions corresponding to a target of the second start or end offset;

merging the first pseudo exception block with the second pseudo exception block to form a merged exception block, wherein the second pseudo exception block is appended to the first pseudo exception block;

assigning new offsets to corresponding pseudo instructions m the merged exception block; and replacing the third pointer and the fourth pointer with modified start or end offsets reflecting the new offsets to the corresponding pseudo instructions in the merged exception block.

8. The non-transitory computer-readable storage medium of claim 7, further comprising:

the second byte sequence comprises a prologue sequence, a sentinel sequence, and an epilogue sequence, the sentinel sequence being situated after the prologue sequence and the epilogue sequence being situated after the sentinel sequence; and the merging further comprises:

identifying the sentinel sequence in the second linked list; and inserting the first linked list at the start of the sentinel sequence and before the epilogue sequence of the second linked list.

9. The non-transitory computer-readable storage medium of claim 7, further comprising:

converting the merged linked list into a third byte sequence, the third byte sequence comprising the first byte sequence and the second byte sequence with the modified branch target offsets;

wherein the third byte sequence comprises instrumented code.

10. The non-transitory computer-readable storage medium of claim 7, further comprising:

appending a second local variable list corresponding to the template method to a first local variable list corresponding to the target method to form a single local variable list, the first local variable list having a first number of local variables; and offsetting an index associated with the second local variable list by the first number.

11. The non-transitory computer-readable storage medium of claim 10, further comprising:
converting the merged linked list into a third byte sequence, the third byte sequence comprising the first byte sequence and the second byte sequence with the modified branch target offsets;
appending the merged exception block to the third byte sequence; and
adding the single local variable list to a header of an instrumented method comprising the third byte sequence and the merged exception block.

12. The non-transitory computer-readable storage medium of claim 7, further comprising:
loading an application module comprising the target method into a memory;
analyzing the application module to determine the target method to be instrumented;
identifying the template method to merge with the target method; and
storing an identifier indicating the template method, the identifier persisting until a change in the application module.

13. A system for instrumenting software code in a processing server, comprising:
a processor configured to load an application module into a memory; and
an instrumentation module configured to:
convert a target method comprising a first byte sequence into a first linked list of corresponding first pseudo instructions and converting a template method comprising a second byte sequence into a second linked list of corresponding second pseudo instructions;
replace a first branch target offset in the first linked list with a first pointer and a second branch target offset in the second linked list with a second pointer;
merge the first linked list with the second linked list to form a merged linked list;
assign a new offset to each of the corresponding first and second pseudo instructions and replacing the first pointer and the second pointer with modified branch target offsets reflecting the new offset to each of the corresponding first and second pseudo instructions;
wherein the processor is further configured to execute the instrumentation module;
convert a target exception block into a first pseudo exception block and convert a template exception block into a second pseudo exception block;
replace a first start or end offset of the target exception block with a third pointer, the third pointer pointing to instructions corresponding to a target of the first start or end offset;
replace a second start or end offset of the template exception block with a fourth pointer, the fourth pointer pointing to instructions corresponding to a target of the second start or end offset;
merge the first pseudo exception block with the second pseudo exception block to form a merged exception block, wherein the second pseudo exception block is appended to the first pseudo exception block;
assign new offsets to corresponding pseudo instructions in the merged exception block; and
replace the third pointer and the fourth pointer with modified start or end offsets reflecting the new offsets to the corresponding pseudo instructions in the merged exception block.

14. The system of claim 13, wherein the second byte sequence comprises a prologue sequence, a sentinel sequence, and an epilogue sequence, the sentinel sequence being situated after the prologue sequence and the epilogue sequence being situated after the sentinel sequence, and the instrumentation module is further configured to:
identify the sentinel sequence in the second linked list; and
insert the first linked list at the start of the sentinel sequence and before the epilogue sequence of the second linked list.

15. The system of claim 13, wherein the instrumentation module IS further configured to:
convert the merged linked list into a third byte sequence, the third byte sequence comprising the first byte sequence and the second byte sequence with the modified branch target offsets;
wherein the third byte sequence comprises instrumented code.

16. The system of claim 13, wherein the instrumentation module IS further configured to:
append a second local variable list corresponding to the template method to a first local variable list corresponding to the target method to form a single local variable list, the first local variable list having a first number of local variables; and
offset an index associated with the second local variable list by the first number.

17. The system of claim 13, further comprising:
an analysis module configured to analyze an application module comprising the target method and identify the template method to merge with the target method;
wherein the processor is further configured to store the identifier in the memory until a change in the application module.

* * * * *